United States Patent [19]
Izumi et al.

[11] Patent Number: 6,022,400
[45] Date of Patent: Feb. 8, 2000

[54] POLISHING ABRASIVE GRAINS, POLISHING AGENT AND POLISHING METHOD

[75] Inventors: Hirohiko Izumi; Masatoshi Sakai; Michihiro Yoshinaga, all of Tokyo, Japan

[73] Assignee: Nippon Steel Corporation, Tokyo, Japan

[21] Appl. No.: 09/081,132

[22] Filed: May 19, 1998

[30] Foreign Application Priority Data

May 22, 1997 [JP] Japan .................................. 9-132411

[51] Int. Cl.[7] .................................. B24B 1/00; C09K 3/14
[52] U.S. Cl. .................................. 106/3; 51/307; 51/308; 51/309; 451/28; 451/36
[58] Field of Search .................................. 451/36, 28; 51/307, 51/308, 309; 106/3; 423/263, 608, 605, 610, 604, 635, 636, 625; 428/403, 404, 405, 407; 516/33, 34, 28, 79, 87, 88, 89, 90, 93, 97

[56] References Cited

U.S. PATENT DOCUMENTS

| | | | |
|---|---|---|---|
| 4,968,381 | 11/1990 | Prigge et al. | 156/636 |
| 5,078,801 | 1/1992 | Malik | 438/693 |
| 5,372,905 | 12/1994 | Deusser et al. | 428/404 |
| 5,480,476 | 1/1996 | Cook et al. | 106/3 |
| 5,709,588 | 1/1998 | Muroyama | 451/41 |
| 5,858,813 | 1/1999 | Scherber et al. | 423/693 |
| 5,877,089 | 3/1999 | Kishii et al. | 438/693 |

FOREIGN PATENT DOCUMENTS

| | | |
|---|---|---|
| 2-275629 | 11/1990 | Japan . |
| 2-235519 | 9/1995 | Japan . |
| 8-22970 | 1/1996 | Japan . |

OTHER PUBLICATIONS

Amorphous silica (Fuso Siltech Co., Ltd.) no date.

*Primary Examiner*—C. Melissa Koslow
*Attorney, Agent, or Firm*—Pollock, Vande Sande & Amernick

[57] ABSTRACT

Surfaces of substrates, typically semiconductor device substrates, are polished with a polishing agent comprising polishing abrasive grains of a metal oxide (e.g. cerium oxide, zirconium oxide or manganese oxide) having a hydrophilic surface and a surface potential (zeta potential) of not more than 50 mV at pH 7 in absolute value, preferably polishing abrasive grains having hydrophilic groups, preferably hydroxyl groups, at the extremities and then cleaned with an aqueous cleaning solution comprising pure water. The polishing abrasive grains remaining on the polished substrate surface can be removed to a satisfactory degree therefrom by simple cleaning using the aqueous cleaning solution only.

4 Claims, 5 Drawing Sheets

POLISHING ABRASIVE GRAINS, POLISHING AGENT AND POLISHING METHOD

BACKGROUND OF THE INVENTION

1) Field of the Invention

The present invention relates to polishing abrasive grains, a polishing agent and a polishing method for use in polishing the surfaces of substrates, particularly semiconductor substrates, so called "bare wafers", and more particularly semiconductor device substrates. The term "semiconductor device substrates" used herein means substrates with a deposited thin film or films including a thin oxide film and a thin metallic film and/or a printed wiring thereon.

2) Description of the Related Art

According to the conventional polishing method, polishing, typically mirror polishing, of semiconductor device substrate surface is carried out by first supplying a polishing agent onto a polishing cloth-mounted table, and then pressing a substrate mounted on a support plate onto the turning or oscillating table with an appropriate pressing force, thereby polishing and flattening the substrate surface. Then, the polished substrate surface is cleaned to remove grains, particularly polishing abrasive grains of the polishing agent remaining on the substrate surface.

To remove metallic contamination, for example, due to metallic impurities originating from the polishing equipment, polishing cloth, polishing agent, etc. from the polished substrate surface after the polishing, at least following 4 steps are required:

1) Mechanical cleaning by brushing to remove fine grains remaining on the polished substrate surface after the polishing,
2) Cleaning with an alkaline solution to further completely remove the fine grains from the polished substrate surface,
3) Cleaning with an acid solution or chelating agent to remove metallic contamination from the polished substrate surface, and
4) Precleaning of the polished substrate surface for successive steps.

In the above-mentioned conventional polishing method, the polished substrate must be subjected to at least said four cleaning steps 1) to 4) to remove metallic contamination from the polished substrate surface. In some cases, each of the cleaning steps must be carried out repeatedly, depending upon cleaning conditions, with the result of much increased cleaning runs. Sometimes, cleaning with a very dilute acid solution may be required, as in a case of polished semiconductor device substrates with printed aluminum (alloy) wirings on the surfaces, where such problems as corrosion of the wirings are always involved with the result of inevitable yield deterioration.

Without the cleaning with a cleaning solution having an adverse corrosive effect on the printed aluminum wirings to avoid the corrosion of wirings, on other hand, another problem such as failure to remove the metallic contamination caused mainly by the remaining polishing abrasive grains from the substrate surface will be involved.

U.S. Pat. No. 4,968,381 discloses a polishing method using a polishing agent containing at least one polar compound having hydrophilic and hydrophobic groups selected from the group consisting of alcohols, ketones, ethers, esters and amides, such as diethyleneglycol diethylether or diethyleneglycol dimethyl ether as an additive at the final phase of the polishing process.

JP-A 2-275629 discloses a polishing method for rinse-polishing a semiconductor device substrate with a diluted solution of an oxidizing agent such as sodium peroxide, sodium chlorate, hydrogen peroxide, ozone, etc. just before the completion of polishing, thereby making the semiconductor device substrate surface hydrophilic.

JP-A 7-235519 discloses a polishing method using a liquid mixture of hydrobromic acid, glycerine and water as a polishing agent, thereby making the semiconductor device substrate surface hydrophilic after the final polishing.

JP-A 8-22970 discloses a polishing method using a polishing agent containing an organic compound having at least one hydrophilic group such as carboxyl group, sulfor group, etc. and a molecular weight of at least 100, such as polymeric ammonium polycarboxylate and polymeric ammonium polysulfonate, thereby preventing dishing.

Furthermore, high purity amorphous silica fine powder produced by sol-gel process using alkoxysilane as starting material [e.g. Quatron colloid (PL series), trademark of products made by Fuso Siltech Co., Ltd., Japan], and synthetic silica fine powder showing a lipophilic property upon alkyl modification [e.g. Quatron water-repellent fine powder (WR series), trademark of products made by Fuso Siltech K.K., Japan] are now commercially available. Uses of PL series include, for example, not only a polishing agent for semiconductor device substrates but also fillers for various coatings and synthetic glass materials.

SUMMARY OF THE INVENTION

An object of the present invention is to provide polishing abrasive grains, a polishing agent and a polishing method, capable of removing polishing abrasive grains remaining on the surface of a polished substrate to a satisfactory degree by simple cleaning using an aqueous cleaning solution comprising pure water after polishing the substrate surface.

In one aspect, the present invention provides polishing abrasive grains.

The present polishing abrasive grains are characterized in that the grains have a hydrophilic surface. Absolute value of surface potential (zeta potential) as an indicator of surface hydrophilic property is in a range of 0 to 50 mV when measured at pH 7.

Method for imparting a surface hydrophilic property to the polishing abrasive grains is not particularly limited, and preferably includes a method for terminating at least a portion, preferably at least 80%, and more preferably the whole of extremities of polishing abrasive grains with hydrophilic functional groups.

The present polishing abrasive grains are preferably composed of oxide of at least one metal species selected from the metal group consisting of light metals, transition metals and rare earth metals, and at least a portion, preferably at least 80%, more and preferably the whole of whose extremities of the polishing abrasive grains has hydrophilic functional groups. The term "light metals" used herein means metals with a small specific gravity such as alkali metals, alkaline earth metals, aluminum, beryllium, magnesium, etc. The term "oxide of metal" used herein means an oxide of preferably aluminum, zirconium, manganese, titanium, cerium, calcium, barium or copper. The term "hydrophilic functional groups" used herein means groups containing such an atom as oxygen, nitrogen, sulfur or the like, including, for example, hydroxyl groups, carboxyl groups, amino groups, carbonyl groups, sulfo groups, etc., and preferably hydroxyl groups.

The present polishing abrasive grains terminated with hydrophilic groups, for example, hydroxyl groups, at the extremities can be prepared by a plasma irradiation method and a sol-gel process (process for preparing an oxide hydrate sol by hydrolyzing a metal alkoxide) known to those skilled in the art using a metal alkoxide containing the relevant metal species as a starting material, among which the sol-gel process is preferable.

Metal alkoxide for use in the sol-gel process is not particularly limited, so long as it is an alcohol ester of a metal species selected from the above-mentioned metal group, but preferably the number of carbon atoms in the alkoxy group is 1 to 4 from the viewpoint of the ease of hydrolysis. Process for preparing a metal alkoxide is not particularly limited, and includes well known processes to those skilled in the art such as processes for reaction of simple metals, metal oxides, metal hydroxides or metal halides with alcohol. A method for terminating the polishing abrasive grains with functional groups such as carboxyl groups, amino groups, carbonyl groups sulfo groups, etc. at the extremities is also not particularly limited, and methods well known to those skilled in the art are available.

To prevent metallic contamination, preferably the metal alkoxide is a high purity metal alkoxide containing no more than 10 ppm, preferably no more than 1 ppm, and more preferably no more than 0.1 ppm of other metal species than the relevant metal species.

The larger the grain size of polishing abrasive grains, the more improved the polishing rate, but the polishing abrasive grains having larger grain sizes than the necessary sizes may damage the substrate. Thus, the grain sizes are usually in a range of 1 to 10,000 nm, preferably 10 to 100 nm, and more preferably 20 to 50 nm.

In another aspect, the present invention provides a polishing agent.

The present polishing agent comprises the above-mentioned polishing abrasive grains and a solvent. The solvent may contain a dispersion agent such as well known surfactants, etc. or electrolytic ionized water, etc., if required, as well as deionized water. The dispersion agent such as a surfactant, etc. can be contained at a concentration of no more than 10% by weight, preferably no more than 3% by weight, and more preferably 1 to 3% by weight, on the basis of total weight of the solvent. Ranges of pH of the polishing agent is not particularly limited and can be selected appropriately in view of the desired use. In case of polishing the deposited oxide film of a semiconductor device silicon substrate, pH is 8 to 13, preferably 8 to 12, and more preferably 10 to 12, where pH can be adjusted by adding an amine such as monoethylamine, isopropylamine or the like, KOH, ammonia or the like thereto. In case of polishing the deposited metallic film of the semiconductor device silicon substrate, pH is 2 to 6, preferably 2 to 5, and more preferably 3 to 4, where pH can be adjusted by adding iron nitrate, copper sulfate or the like thereto.

It is preferable that polishing abrasive grains are uniformly dispersed in the polishing agent. For example, the polishing abrasive grains can be brought into a colloidal state or in a uniformly dispersed state by adding a dispersion agent such as a surfactant, etc. thereto, as mentioned above.

The lower the viscosity of a polishing agent, the harder to uniformly disperse the polishing abrasive grains, whereas the higher the viscosity, the harder to polish the semiconductor device silicon substrate while maintaining uniform thickness of the oxide film or metallic film of the semiconductor device silicone substrate. Thus, the viscosity, when measured at 25° C. by the method specified JIS Z 8803 using a rotation viscometer in a dispersion of 1% by weight of polishing abrasive grains in a solvent, is usually 1 to 10 mpa•s, preferably 1 to 5 mPa•s, and more preferably 1 to 2 mpa•s.

In yet another aspect, the present invention provides a polishing method.

The present polishing method comprises a first step of polishing a substrate surface with the above mentioned polishing agent and a second step of cleaning the polished substrate surface from the first step with an aqueous cleaning solution, thereby removing remaining polishing abrasive grains from the polished substrate surface.

Polishing temperature is usually in a range of 10° to 70° C., preferably 20° to 50° C., and more preferably 20° to 40° C. When polishing is carried out in polishing equipment by pressing a substrate onto polishing cloth mounted on a turning table, the table can be turned at 10 to 200 r/min, preferably 20 to 80 r/min, and more preferably 20 to 50 r/min; the pressing force to the substrate can be 1 to 15 psi (6895 to 103421 Pa), preferably 3 to 10 psi (20684 to 68948 Pa), and more preferably 3 to 7 psi (20684 to 48263 Pa); and the feed rate of polishing agent is 0.1 to 1.0 l/min, preferably 0.1 to 1.5 l/min, more preferably 0.2 to 0.3 l/ min.

Polishing rate of a oxide film, as determined under standard polishing conditions (i.e. polishing temperature: 25° C.; table turning speed: 30 r/min; and pressing force: 7 psi (48263 Pa)), is 100 to 300 nm/min, preferably 150 to 250 nm/min.

Polishing rate of a metallic film, as determined standard polishing conditions (i.e. polishing temperature: 25° C.; table turning speed: 50 r/min and pressing force: 4 psi (27579 Pa)), is 150 to 400 nm/min, preferably 250 to 400 nm/min.

Cleaning solution is not particularly limited, so long as it is an aqueous cleaning solution. For example, an aqueous solution comprising ammonia, hydrogen peroxide and pure water usually in a weight ratio of ammonia:hydrogen peroxide:water=1–2:1–5:4–40. The cleaning solution may further contain a chemical such as a chelating agent, e.g. citric acid, in a proportion of 2 to 30% by weight, preferably 2 to 10% by weight, and more preferably 5 to 10% by weight on the basis of total weight of the cleaning solution. Cleaning temperature is not particularly limited and is, for example, in a range of 70° to 90° C.

The present polishing abrasive grains, polishing agent and polishing method are applicable to polishing of semiconductor device substrates, particularly semiconductor device silicon substrates.

The present polishing agent contains polishing abrasive grains having hydrophilic surfaces, particularly those terminated with hydrophilic functional groups at the extremities. Thus, the present polishing agent is very compatible with the aqueous cleaning solution comprising pure water used in the cleaning step following the polishing, and thus can be effectively transferred in to the cleaning solution from the surfaces of polished substrates by simple cleaning thereby facilitating and ensuring removal of the remaining polishing abrasive grains.

For example, when most widely used semiconductor device silicon substrates are to be polished with a polishing agent containing the conventional cerium oxide polishing abrasive grains with no hydrophilic extremities and then cleaned with an aqueous cleaning solution, no electrochemical repulsion force occurs at all between the polished substrates and the polishing abrasive grains remaining on the surfaces of the polished semiconductor device silicon substrates in the cleaning solution due to the material difference between the substrates and the polishing abrasive grains, and thus the polished substrates cannot be cleaned to a satisfactory degree and the polishing abrasive grains still remain even considerably after the cleaning. In the present invention, on the other hand, cerium oxide polishing abrasive grains with hydrophilic extremities are used. That is, the present polishing abrasive grains have a good hydrophilic property as mentioned above, and thus have a good compatibility with an aqueous cleaning solution. Accordingly, the remaining polishing abrasive grains can be readily removed from the polished substrate surfaces with the aqueous cleaning solution and the polished substrate surfaces can be cleaned to a satisfactory degree. Such effects of the present invention can be obtained not only with cerium oxide but also with oxides of metal species selected from the metal group consisting of light metals, transition metals, rare earth metals, etc., so long as they have a hydrophilic surface as mentioned above. According to the present invention, a polishing agent having good polishability and cleaning susceptibility can be obtained with the polishing agent containing a hydrophilic surface, selected from oxides of the above-mentioned metal group.

DETAILED DESCRIPTION OF THE INVENTION

The present polishing abrasive grains, polishing agent and polishing method will be described in detail below, referring to preferable embodiments, Example and drawings, which are not intended to limit the present invention.

First Embodiment

The present invention will be explained below according to a first embodiment, where a semiconductor device silicon substrate is polished with a polishing agent comprising cerium oxide polishing abrasive grains having a hydrophilic surface as metal oxide polishing abrasive grains.

Figure 1:
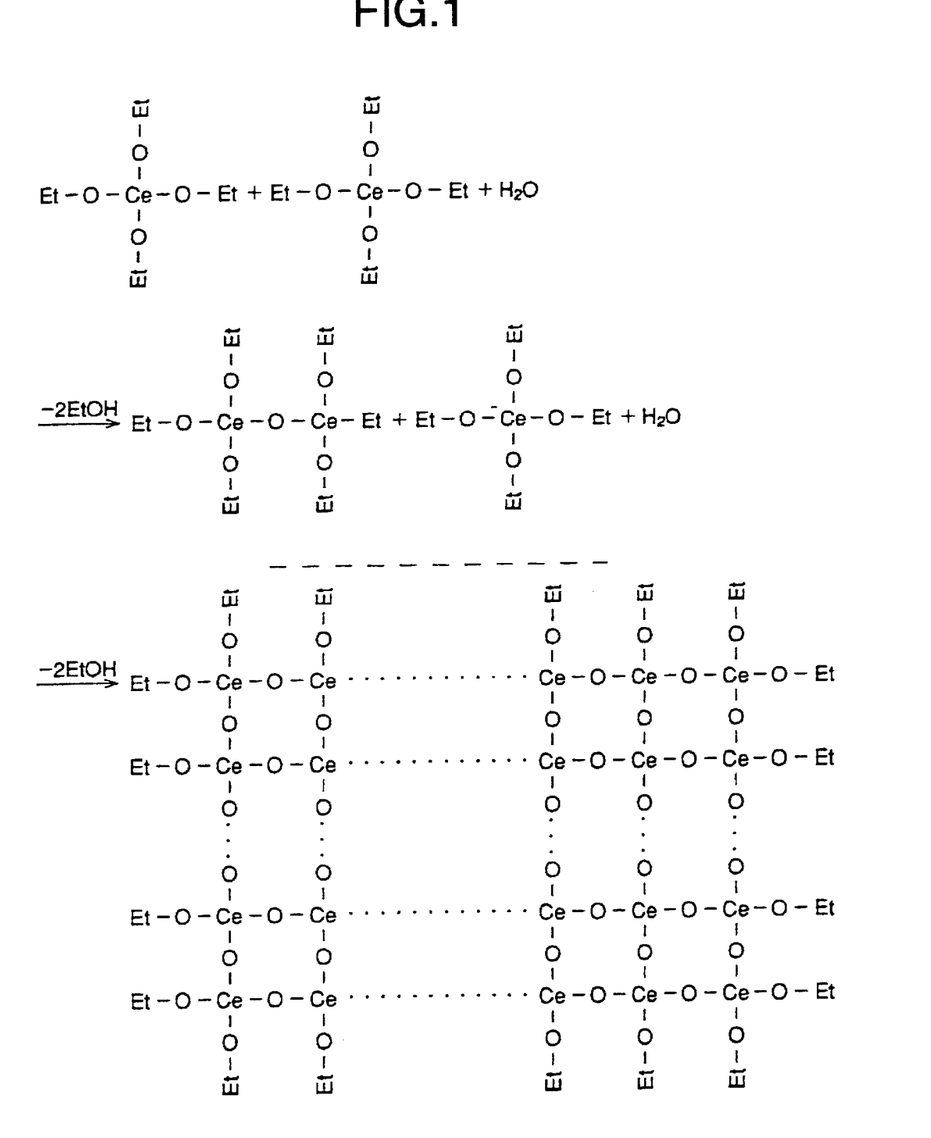
FIG. 1 shows typical structural formulas in process of forming polishing abrasive grains according to a first embodiment of the present invention.

FIG. 1 shows structural formulas in process of forming polishing abrasive grains for the polishing agent according to the first embodiment.

To form the polishing abrasive grains, tetraethoxycerium as a starting material is subjected to a water-addition polycondensation reaction in the presence of a specific catalyst to form a cerium (Ce) network through oxygen atoms and allow the cerium network to grow into a larger network while maintaining the same structure as normal crystal structure of cerium oxide and finally into abrasive grains of cerium oxide. The resulting abrasive grains in this state still contain a large amount of ethoxy groups and can react with remaining unreacted starting material, resulting in formation of grain size-uncontrollable gel. By subjecting the abrasive grains to distillation at about 100° C. while adding water thereto, the abrasive grains are terminated with hydroxyl groups at the extremities, whereby ultimate polishing abrasive grains having a hydrophilic surface can be obtained. By this treatment, the polishing abrasive grains can be terminated with hydroxyl groups typical of hydrophilic groups at the extremities to such a degree as to make the polishing abrasive grains hydrophilic. Sometimes, "—O—" bonds may be formed by dehydration of adjacent two hydroxyl groups, and such abrasive grains with "—O—" bonds are within the scope of the present invention, if such "—O—" bonds are in such a proportion as not to give any influence on the required hydrophilic property of the abrasive grain surfaces. This will be applicable to second and third embodiments of the present invention which follow. A polishing agent comprising such polishing abrasive grains having a hydrophilic surface can serve to polish substrate surfaces, typically, semiconductor device silicon substrate surfaces.

In the formation of the present polishing abrasive grains, the degree of polymerization (grain size of polishing abrasive grains) can be adjusted by controlling the water-addition polycondensation reaction time. For example, the grain size of the polishing abrasive grains can be adjusted in a range of about 10 to about 10,000 nm.

Figure 2:
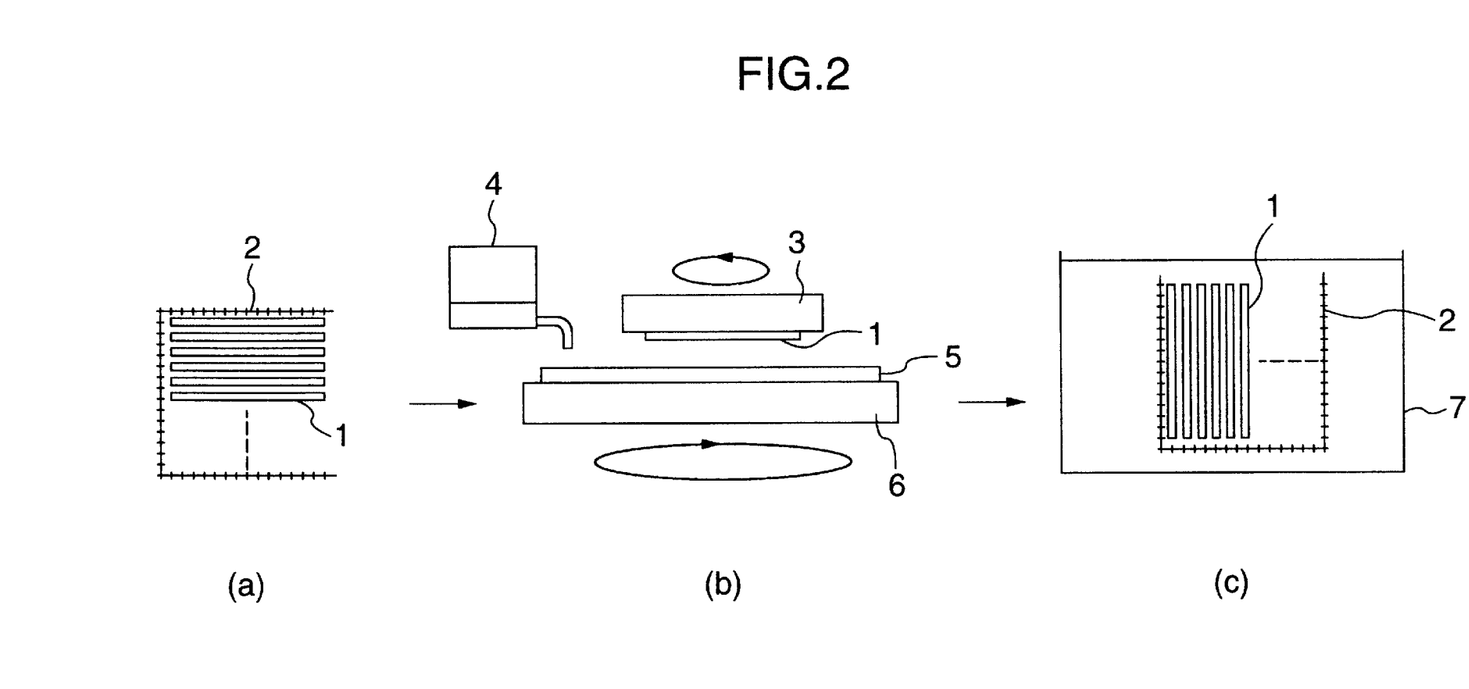
FIG. 2 is a schematic flow sheet showing the polishing step and the cleaning step for semiconductor device silicon substrates according to the first embodiment of the present invention.

Then, semiconductor device substrate surfaces are flattened by chemico-mechanical polishing (CMP), using the above-mentioned polishing agent, as shown in FIG. 2.

As shown in FIG. 2(a), a semiconductor device silicon substrate 1 is transferred from a substrate carrier 2 to a support plate 3, where the substrate 1 is supported on the support plate 3. Then, as shown in FIG. 2(b), the above-mentioned polishing agent is supplied from a polishing agent feed means 4 onto polishing cloth 5. The semiconductor device silicon substrate 1 is pressed onto the polishing cloth mounted on a turning table 6 while supplying the polishing agent thereto to polish the surface of semiconductor device silicon substrate 1 with a pressing force for about 2 to about 5 minutes, thereby flattening the substrate surface.

Then, as shown in FIG. 2(c), the substrate carrier 2 encasing polished semiconductor device silicon substrates 1 is dipped in a cleaning tank 7 filled with a cleaning solution to clean the surfaces of polished semiconductor device substrates 1.

The present polishing agent used in the polishing step contains cerium oxide polishing abrasive grains having hydroxyl groups typical of the hydrophilic functional groups terminated on the extremities. Thus, the present polish agent has a good compatibility with an aqueous cleaning solution comprising pure water to be used in the cleaning step after the polishing. Accordingly, the cerium oxide polishing abrasive grains remaining on the surfaces of polished semiconductor device silicon substrates can be readily and assuredly removed from the surfaces with the aqueous cleaning solution. A polishing agent comprising cerium oxide polishing abrasive grains with no hydrophilic surface typical of conventional metal oxide polishing abrasive grains cannot be removed to a satisfactory degree from the polished semiconductor device silicon substrate surfaces in the cleaning step, because of material difference between the cerium oxide polishing abrasive grains and the semiconductor device silicon substrates. On the other hand, the present polishing agent having a distinguished hydrophilic property can have good compatibility with and cleaning susceptibility to the aqueous cleaning solution even if cerium oxide is used as a metal oxide for the polishing abrasive grains.

Thus, when the surface of a semiconductor device silicon substrate 1 is polished with a polishing agent according to the first embodiment of the present invention, the polishing abrasive grains remaining on the surface of polished semiconductor device silicon substrate 1 can be removed to a satisfactory degree from the surface by simple cleaning only with an aqueous cleaning solution comprising pure water without any complicated cleaning step as in the conventional cleaning, thereby enabling simple and satisfactory removal of metallic contamination from the surface of polished semiconductor device silicon substrate 1.

Second Embodiment

A second embodiment of the present invention will be described below, where a polishing agent is used comprising polishing abrasive grains with hydrophilic functional groups terminated on the extremities similar to that of the first embodiment except only that the metal oxide used is different from that of the first embodiment.

Figure 3:
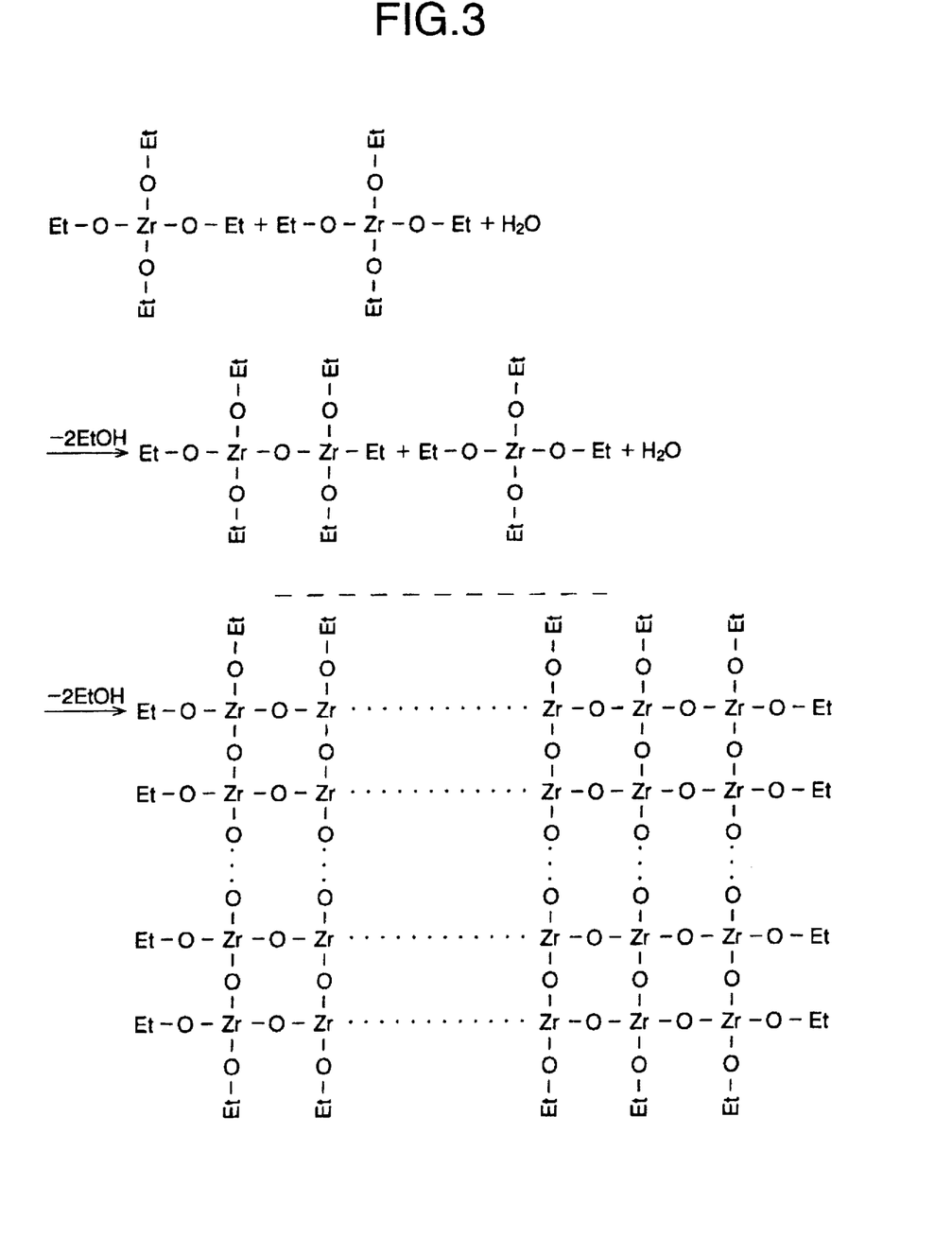
FIG. 3 shows typical structural formulas in process of forming polishing abrasive grains according to a second embodiment of the present invention.

FIG. 3 shows structural formulas in process of forming polishing abrasive grains for a polishing agent according to the second embodiment of the present invention, where a zirconium (Zr) network is formed by a water-addition polycondensation reaction in the presence of a specific catalyst as in the first embodiment, followed by allowing the network to grow into a larger network, while maintaining the same structure as normal crystal structure of zirconium oxide and ultimately into zirconium oxide polishing abrasive grains through a similar treatment to that of the first embodiment. The resulting polishing abrasive grains are terminated with hydroxyl groups typical of hydrophilic groups at the extremities to such a degree as to make the surfaces of the polishing abrasive grains hydrophilic. A polishing agent comprising such polishing abrasive grains can serve to polish substrate surfaces, typically, semiconductor device silicon substrate surfaces.

The polishing agent according to the second embodiment of the present invention contains zirconium oxide polishing abrasive grains having hydroxyl groups typical of the hydrophilic functional groups formated on the extremities. Thus, the present polishing agent has good compatibility with and cleaning susceptibility to an aqueous cleaning solution comprising pure water to be used in the cleaning step after the polishing. Accordingly, the zirconium oxide polishing abrasive grains remaining on the polished semiconductor device silicon substrate surfaces can be readily and assuredly removed from the surfaces with the aqueous cleaning solution. A polishing agent comprising zirconium oxide polishing abrasive grains with no hydrophilized extremities typical of conventional metal oxide polishing abrasive grains cannot be removed to a satisfactory degree from the surfaces of polished semiconductor device silicon substrate surfaces in the cleaning step, because of material difference between the zirconium oxide polishing abrasive grains and the semiconductor device silicon substrates. On the other hand, the present polishing agent having a distinguished hydrophilic property can have good compatibility with and cleaning susceptibility to the aqueous cleaning solution even if zirconium oxide is used as a metal oxide for the polishing abrasive grains.

Thus, when substrate surfaces, typically semiconductor device silicon substrate surfaces, are polished with a polishing agent according to the second embodiment of the present invention, the polishing abrasive grains remaining on the substrate surfaces can be removed to a satisfactory degree from the surfaces by simple cleaning only with an aqueous cleaning solution comprising pure water without any complicated cleaning step as in the conventional cleaning, thereby enabling simple and satisfactory removal of metallic contamination from the polished substrate surfaces.

Third Embodiment

A third embodiment of the present invention will be described below, where a polishing agent is used comprising polishing abrasive grains with hydrophilic functional groups terminated on the extremities similar to that of the first embodiment except only that the metal oxide used is different from that of the first embodiment.

Figure 4:
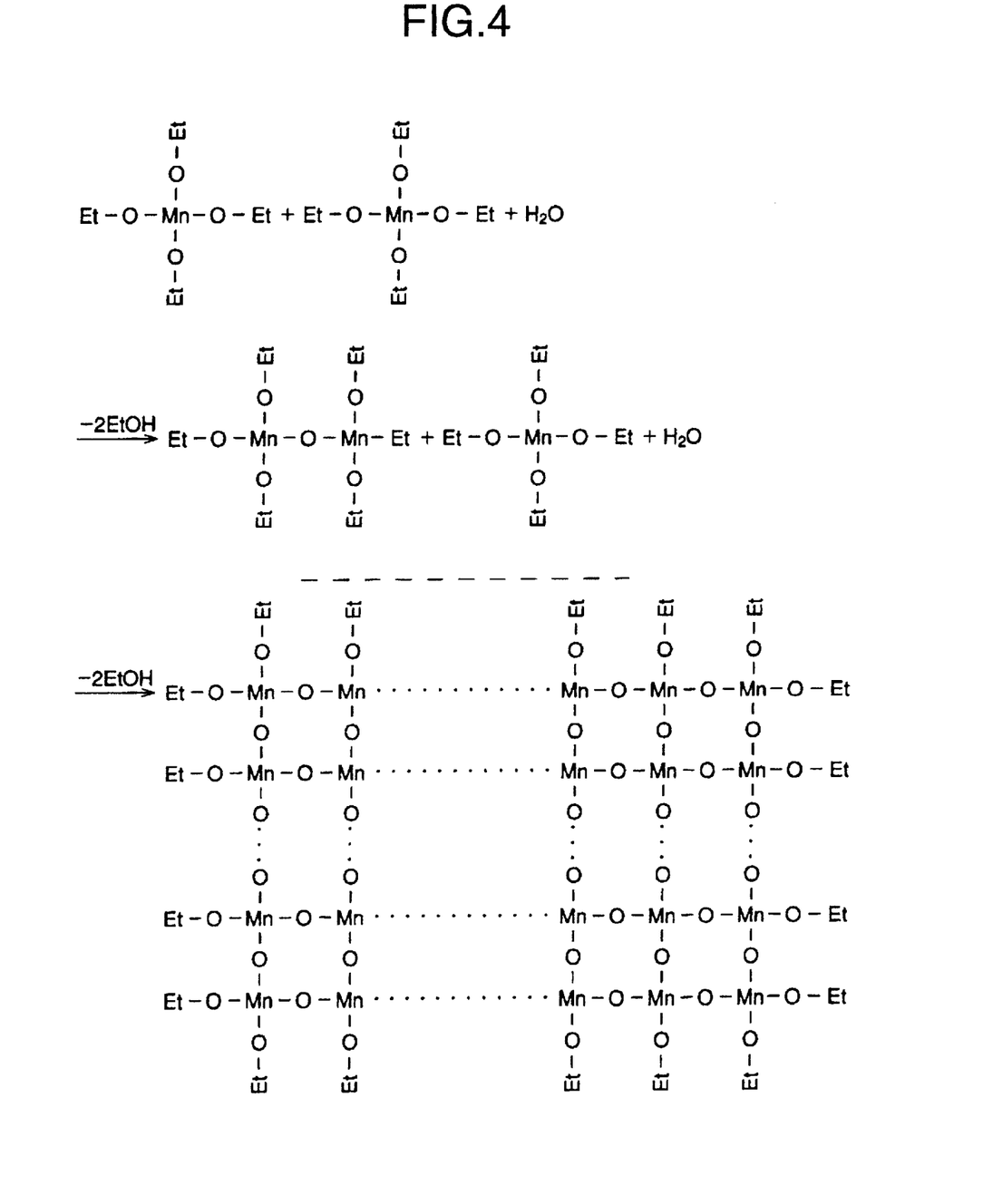
FIG. 4 shows typical structural formulas in process of forming polishing abrasive grains according to a third embodiment of the present invention.

FIG. 4 shows structural formulas in process of forming polishing abrasive grains for a polishing agent according to the third embodiment of the present invention, where a manganese (Mn) network is formed by water-addition polycondensation reaction in the presence of a specific catalyst as in the first embodiment, followed by allowing the network to grow into a larger network, while maintaining the same structure as normal crystal structure of manganese oxide and ultimately into manganese oxide polishing abrasive grains through a similar treatment to that of the first embodiment. The resulting polishing abrasive grains are terminated with hydroxyl groups typical of hydrophilic groups, at the extremities to such a degree as to make the surfaces of the polishing abrasive grains hydrophilic. A polishing agent comprising such polishing abrasive grains can serve to polish substrate surfaces, typically, semiconductor device silicon substrate surfaces.

The polishing agent according to the third embodiment of the present invention contains manganese oxide polishing abrasive grains having hydroxyl groups typical of the hydrophilic functional groups terminated at the extremities. Thus, the present polishing agent has good compatibility with and cleaning susceptibility to an aqueous cleaning solution comprising pure water to be used in the cleaning step after the polishing. Accordingly, the manganese oxide polishing abrasive grains remaining on the polished substrate surfaces can be readily and assuredly removed from the surfaces with the aqueous cleaning solution. A polishing agent comprising manganese oxide polishing abrasive grains with no hydrophilic extremities typical of conventional metal oxide polishing abrasive grains cannot be removed to a satisfactory degree from the polished substrate surfaces in the cleaning step because of material difference between the manganese oxide polishing abrasive grains and the semiconductor device silicon substrates. On the other hand, the present polishing agent having a distinguished hydrophilic property can have good compatibility with and cleaning susceptibility to the aqueous cleaning solution even if manganese oxide is used as a metal oxide for the polishing abrasive grains.

Thus, when substrate surfaces, typically semiconductor device silicon substrate surfaces, are polished with a polishing agent according to the third embodiment of the present invention, the polishing abrasive grains remaining on the polished substrate surfaces can be removed to a satisfactory degree from the surface by simple cleaning only with an aqueous cleaning solution comprising pure water without any complicated cleaning step as in the conventional cleaning, thereby enabling simple and satisfactory removal of metallic contamination from the polished substrate surfaces.

The foregoing first to third embodiments of the present invention show cerium oxide, zirconium oxide and manganese oxide as metal oxide with hydrophilic functional groups terminated at the extremities, but the present invention is not limited to only these three species. Besides the above-mentioned metal oxides, other oxides of transition metals and rare earth metals and oxides of light metals such as aluminum oxide, etc. can be used as polishing abrasive grains in the present invention.

Example

Semiconductor device silicon substrate surfaces were polished with the present polishing agent comprising polishing abrasive grains with hydrophilic surfaces and then cleaned in dip-type, cleaning equipment as shown in the foregoing first embodiment of the present invention. The degree of cleaning of polished semiconductor device silicon substrate surfaces was examined in comparison with those obtained with the conventional polishing agent. The values of the surface potential (the zeta potential) of the polishing abrasive grains of the examples are shown in the following. These values are indication which show as to whether or not the grains in a solution liable to attach to the substrate surfaces.

That is, polishing agents Nos. 1 to 4 were prepared by mixing silicon oxide grains (surface potential (zeta potential) at pH 7:−23 mV), cerium oxide grains (surface potential (zeta potential) at pH 7:−35 mV), zirconium oxide grains (surface potential (zeta potential) at pH 7:−42 mV) or manganese oxide grains (surface potential (zeta potential) at pH 7:−28 mV), each of which was terminated with hydroxyl groups at the extremities and had an average grain size of about 500 nm, with a surfactant and pure water, followed by pH adjustment to 10 by addition of KOH thereto. The surface potential of grains measured using a zeta potential meter, Coulter Delsa 440, trademark of products made by Coulter Corporation, (U.S.A.) by the method specified in the catalogue. The polishing agent each had a metal oxide content of 1% by weight and a viscosity of about 1 mpa•s followed by the method specified JIS Z 8803 using a rotation viscometer as measured at 25° C. For controls, conventional polishing agents Nos. 5 to 8 of Table 1 were used, each of the grains had no hydrophic groups at the extremities.

Surfaces of semiconductor device silicon substrates (8 inches (200 mm) in diameter) were polished with the above-mentioned polishing agents, respectively, at a polishing temperature of 25° C., with a table turning rate of 30 r/min and a pressing force of 4 psi (27579 Pa). Polishing rates of an oxide film deposited on the substrates were found to be about 150 nm/min for the polishing agents Nos. 1 and 5 each containing silicon oxide polishing abrasive grains, about 300 nm/min for the polishing agents Nos. 2 and 6 each containing cerium oxide polishing abrasive grains, about 250 nm/min for the polishing agents Nos. 3 and 7 each containing zirconium oxide polishing abrasive grains and about 300 nm/min for the polishing agents Nos. 4 and 8 each containing manganese oxide polishing abrasive grains, and it was found that the polishing rate had no substantial influence by the presence or absence of hydrophilic groups at the extremities.

Then, the polished semiconductor device silicon substrate surfaces were cleaned with an aqueous cleaning solution at 70° C. in dip-type cleaning equipment shown in FIG. 2(c), and then grains having diameters of at least 0.2 μm remaining on the cleaned substrate surfaces were counted. The aqueous cleaning solution used was a solution comprising ammonia; hydrogen peroxide and pure water in a ratio of 1:2:20 by weight.

Results of counting are shown in the following Table 1.

TABLE 1

| | Number of grains remaining on surfaces of cleaned substrate | |
|---|---|---|
| | The Invention | Conventional |
| Silicon oxide | 29 (No. 1) | 158 (No. 5) |
| Cerium oxide | 48 (No. 2) | 1879 (No. 6) |
| Zirconium oxide | 53 (No. 3) | 2675 (No. 7) |
| Manganese oxide | 35 (No. 4) | 1259 (No. 8) |

Note: Figures in parentheses indicate grain sample numbers as mentioned above.

As is obvious from the results of cleaning in the case of using the conventional polishing agents each comprising metal oxide polishing abrasive grains having diameters of at least 0.2 μm, as shown in Table 1, number of polishing abrasive grains remaining on the cleaned substrate surfaces was in the order of 100, for silicon oxide grains (No. 5), and in the order as large as 1,000 for cerium oxide grains (No. 6), zirconium oxide grains (No. 7), and manganese oxide grains (No. 8), whereas in case of using the present polishing agents the number of cerium oxide grains (No. 2), zirconium oxide grains (No. 3) and manganese oxide grains (No. 4) remaining on the cleaned substrate surfaces could be reduced to the order of 10 equivalent to that of the remaining silicon oxide grains (No. 1).

Thus, the number of polishing abrasive grains remaining on the surfaces of polished substrates could be remarkably reduced on the order of 10 by simple cleaning in case of using the present polishing agents.

Thus, as polishing abrasive grains silicon oxide grains having a surface potential (zeta potential) of not more than 25 mV, cerium oxide grains having a surface potential of not more than 40 mV, zirconium oxide grains having a surface potential of not more than 45 mv and manganese oxide grains having a surface potential of not more than 30 mV at pH 7 in absolute values are preferably used.

Figure 5:
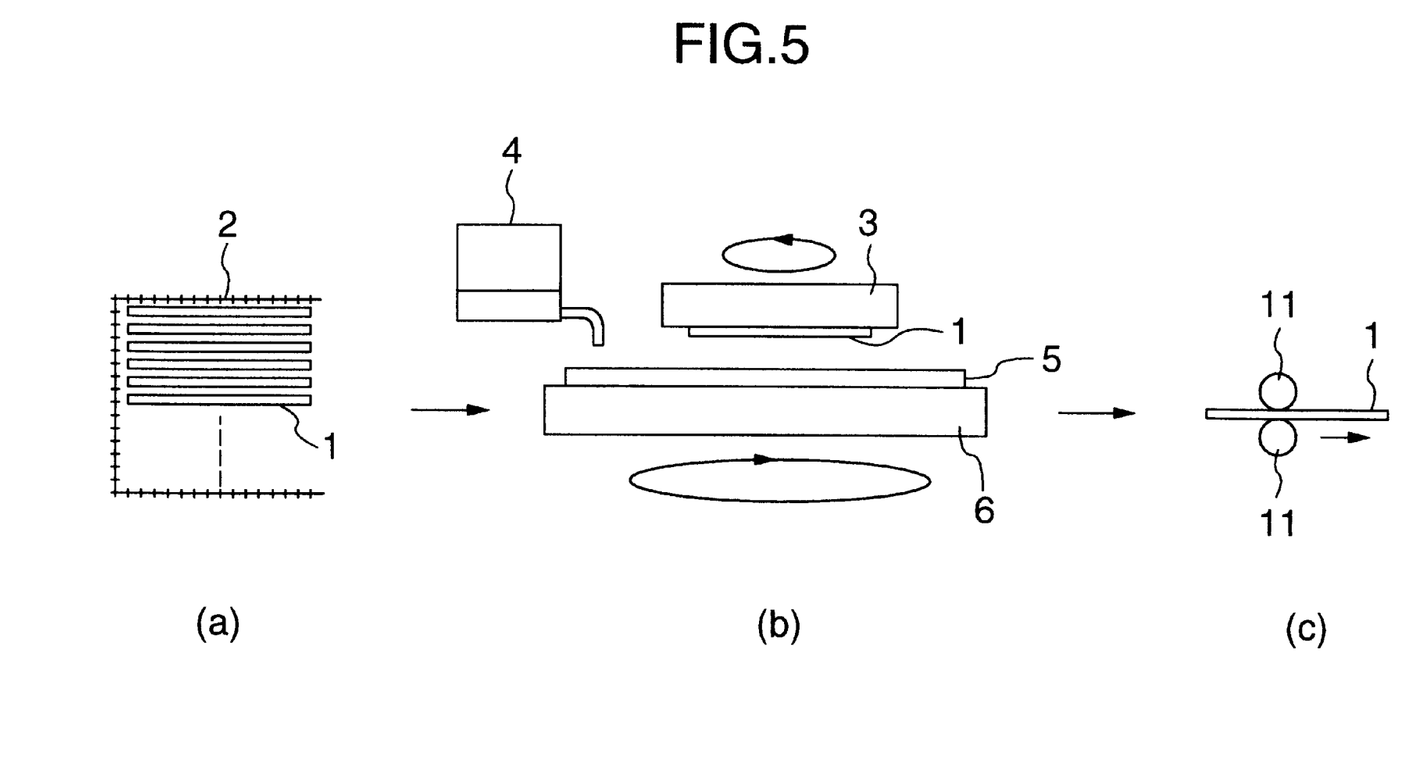
FIG. 5 is a schematic flow sheet showing a polishing step and another cleaning step of semiconductor device silicon substrates according to a further embodiment of the present invention.

In the foregoing test, cleaning of polished substrate surfaces was carried out in dip-type cleaning equipment. To ensure the cleaning, fine grains remaining on the surfaces of polished substrates may be removed by mechanical cleaning using a brush. For example, as shown in FIGS. 5(a) and 5(b), a semiconductor device silicon substrate 1 is transferred to a support plate 3 from a substrate carrier 2 and polished to flatten the surface of the semiconductor device silicon substrate 1 in the same manner as in FIG. 2. Then, as shown in FIG. 5(c), the polished semiconductor device silicon substrate 1 is passed through between a pair of brushes 11 to clean the surface of the polished semiconductor device silicon substrate 1, whereby the number of polishing abrasive grains remaining on the surface of semiconductor device silicon substrate 1 can be reduced to about 10, and the polishing abrasive grains retained in the brushes can be also removed therefrom by continuous rinsing of the brushes, because the polishing abrasive grains have a hydrophilic property. That is, contamination of successive semiconductor device silicon substrates by the polishing abrasive grains released from the substrate surface and retained in the brushes can be prevented.

According to the present invention, polishing abrasive grains remaining on the polished substrate surfaces can be removed to a satisfactory degree by simple cleaning only with an aqueous cleaning solution comprising pure water etc. without any conventional complicated cleaning, after polishing of the substrate surfaces, whereby metallic contamination can be simply removed to a satisfactory degree from the polished substrate surfaces.

What is claimed is:

1. A polishing agent, comprising:

polishing abrasive grains having a hydrophilic surface and a surface potential (zeta potential) with an absolute value of not more than 50 mV at pH 7, the polishing abrasive grains being selected from the group consisting of cerium oxide grains having a surface potential with an absolute value of not more than 40 mV at pH 7 and manganese oxide grains having a surface potential with an absolute value of not more than 30 mV at pH 7.

2. A polishing agent, comprising:

polishing abrasive grains having hydrophilic functional groups at least at a portion of their extremities, the polishing abrasive grains being composed of an oxide of at least one metal species selected from the group consisting of, barium and copper.

3. A method for polishing a substrate surface with a polishing agent comprising polishing abrasive grains and a solvent, the method comprising:

polishing a substrate surface with polishing abrasive grains having a hydrophilic surface and a surface potential (zeta potential) with an absolute value of not more than 50 mV at pH 7, the polishing abrasive grains being selected from the group consisting of cerium oxide grains having a surface potential with an absolute value of not more than 40 mV at pH 7 and manganese oxide grains having a surface potential with an absolute value of not more than 30 mV at pH 7.

4. A method for polishing a substrate surface with a polishing agent comprising polishing abrasive grains and a solvent, the method comprising:

polishing a substrate surface with polishing abrasive grains having a hydrophilic surface and a surface potential (zeta potential) with an absolute value of not more than 50 mv at pH 7, the polishing abrasive grains being composed of oxide of at least one metal species selected from the metal group consisting of manganese, barium and copper.

* * * * *

UNITED STATES PATENT AND TRADEMARK OFFICE
CERTIFICATE OF CORRECTION

PATENT NO. : 6,022,400
DATED : February 8, 2000
INVENTOR(S) : Hirohiko Izumi, et. al.

It is certified that error appears in the above-identified patent and that said Letters Patent is hereby corrected as shown below:

Title page, item [73], Assignee:

After Nippon Steel Corporation, insert --; Fuso Siltech Co., Ltd.; ITOCHU Techno-Chemical Inc., all of--.

Signed and Sealed this

Fifth Day of December, 2000

Attest:

Q. TODD DICKINSON

*Attesting Officer*    *Director of Patents and Trademarks*